United States Patent Office 3,803,307
Patented Apr. 9, 1974

3,803,307
ANTIBIOTIC SL 21429
Annemarie Closse, Binningen, and Hans-Hermann Thiele, Hirschtal, Switzerland, assignors to Sandoz Ltd., also known as Sandoz (A.G.), Basel, Switzerland
No Drawing. Filed Jan. 3, 1972, Ser. No. 215,194
Claims priority, application Switzerland, Jan. 7, 1971, 181/71; Nov. 3, 1971, 16,043/71
Int. Cl. A61k 21/00
U.S. Cl. 424—122                              3 Claims

ABSTRACT OF THE DISCLOSURE

The invention relates to a novel antibiotic, referred to as SL 21429, having the following characteristics:

Yellow crystals having a M.P. between 172 and 182°, with the formation of new crystals having a M.P. of 238° (decomp.).
Specific rotation: $[\alpha]_D^{20} = -376°$ (c.=0.78 in pyridine).
Elementary analysis: C, 73.1%; H, 6.8%; N, 5.3%; O, 15.1%.
Ultraviolet spectrum: maxima at 221 nm. (log $\epsilon'$=1.96), 274 nm. (log $\epsilon'$=1.16), 280 nm. (log $\epsilon'$=1.16), 290 nm. (log $\epsilon'$=1.09) (in methanol) (see FIG. 1).
Infrared spectrum: inter alia bands at 3450, 2920, 1695, 1620 cm$^{-1}$ (in KBr) (see FIG. 2).
Nuclear magnetic resonance spectrum: (in dimethyl sulfoxide) (see FIG. 3).

A process for the production of said antibiotic SL 21429 is also described, which comprises cultivating a strain of the fungus species Chaetomium globosum Kunze ex Fries under aerobic fermentation conditions and separating the SL 21429.

The antibiotic SL 21429 may be used for the treatment of edemas and ulcers, and exhibits an immuno-suppressive effect.

IMPROVEMENTS IN OR RELATING TO ORGANIC COMPOUNDS

The present invention relates to a new antibiotic, hereinafter referred to as SL 21429.

The present invention provides the new antibiotic SL 21429, having the following characteristics:

Yellow crystals having a M.P. between 172 and 182°, with the formation of new crystals having a M.P. of 238° (decomp.).
Specific rotation: $[\alpha]_D^{20} = -376°$ (c.=0.78 in pyridine).
Elementary analysis: C, 73.1%; H, 6.8%; N, 5.3%; O, 15.1%.
Ultraviolet spectrum: maxima at 221 nm. (log $\epsilon'$=1.96), 274 nm. (log $\epsilon'$=1.16), 280 nm. (log $\epsilon'$=1.16), 290 nm. (log $\epsilon'$=1.09) (in methanol) (see FIG. 1).
Infrared spectrum: inter alia bands at 3450, 2920, 1695, 1620 cm.$^{-1}$ (in KBr) (see FIG. 2).
Nuclear magnetic resonance spectrum: (in dimethyl sulfoxide) (see FIG. 3).

The invention also provides a process for the production of the antibiotic SL 21429, which comprises cultivating an SL 21429 producing strain of the fungus species Chaetomium globosum Kunze ex Fries under aerobic fermentation conditions and separating the SL 21429.

A new strain of Chaetomium globosum Kunze ex Fries, usable in the process, was isolated from a soil sample found at Küsnacht, Switzerland, and a specimen of said strain has been deposited with the United States Department of Agriculture (Northern Utilization Research and Development Division), Peoria, Ill., under the reference NRRL 3877. Specimens of said strain will be made available on request. The new strain of the fungus species Chaetomium globosum Kunze ex Fries grows on a malt extract/yeast extract agar at 12 to 37° C., preferably at 27° C., and on this nutrient medium forms a white or light grey aerial mycelium and a light substrate mycelium. After several days of incubation dark, usually olive-brown Perithecia are formed. The under side of the colony and the substrate show a brown coloration.

The fungus in pure culture, e.g. on malt agar, readily forms sporophores at a temperature of 12 to 30° C., and at a higher temperature within 8 to 10 days. These sporophores are green or olive-green, and finally are often dark brown. The sporophores are spherical and have a diameter of 200 to 300µ. At the tip they are perforated by a round opening. Their Peridium consists of brown cells grown together in meandrian form. It is rather rough-skinned. A number of brownish-green hairs arise from the outermost cell layer around the opening, and a somewhat smaller number of hairs from the sides. At the base these hairs have a thickness up to 4.5µ, gradually become thinner up to 3µ, and form distinct waves. They are superficially covered by a number of thorns and are septated over their entire length. The claviforms, stemmed Asci, measuring 50–70 x 12–15µ, arise from the inner base of the Perithecium. They are surrounded by a fine wall, which is dissolved before maturity of the eight ascospores. The ascospores are unicellular, more or less lemon-shaped with somewhat pointed ends; their cross sections, however, are not exactly round, but tend to be elliptical. Initially they are colorless, later reddish and finally dark brown. At one end they are provided with a clearly perceptible germ pore and have a length of 9 to 12 (usually 10 to 11)µ and a width of 6 to 9 (usually 7.5 to 8.5)µ.

Morphologically and physiologically the strain NRRL 3877 of Chaetomium globosum Kunze ex Fries corresponds to the description given by L. M. Ames in "A Monograph of the Chaetomiaceae," The United States Army Research and Development Series, No. 2, pp. 26/27 (1961). It differs from said description by a pronounced green coloration of the sporophores, caused by the color of the hairs.

The new strain NRRL 3877 of Chaetomium globosum Kunze ex Fries may be cultivated on various nutrient media containing assimilable sources of nitrogen and carbon. For example, nutrients usually employed for carbon heterotropic microorganisms may be used. For example, glucose, sucrose, starch, lactose or dextrin may be used as the carbon source, organic and inorganic nitrogen-containing compounds such as peptone, yeast or meat extracts, ammonium sulphate, ammonium nitrate or amino acids may be used as the nitrogen source, as well as the usual mineral salts and trace elements.

The process is suitably effected by inoculating a liquid nutrient medium with a suspension of spores of the new strain of *Chaetomium globosum*, and incubating the culture at 12 to 37° C., preferably at 27° C., at a pH of 5.7 to 6.0. Suitable fermentation times are 6 to 12 days, preferably 10 days. The cultivation is effected under aerobic conditions, for example by static surface culture fermentation, by submerged culture fermentation with shaking, or in fermenters provided with devices for introducing air or oxygen and agitators. As soon as the maximum amount of antibiotic has been produced, the culture solution is filtered, and the antibiotic is obtained from the culture filtrate or the mycelium in manner known per se by extraction and/or adsorption. The new antibiotic may be isolated from the crude extract by chromatography, crystallization or countercurrent distribution.

One convenient method of isolating the antibiotic of the present invention comprises the extraction of the filtrate with ethylene chloride, but other organic solvents, e.g. benzene, chloroform, butyl acetate, methylene chloride, butanol or ethyl acetate, may likewise be used.

The extracts are subsequently freed from the solvent, e.g. by distillation, and the antibiotic is isolated by purifying the residue chromatographically on adsorbing agents such as alumina, silica gel or magnesium silicate, by countercurrent distribution and/or by crystallization.

The new antibiotic SL 21429 is useful because it possesses pharmacological activity in animals. In particular, the compound is useful for the treatment of edemic conditions, as indicated by the bradykinin paw edema test in the rat.

The antibiotic SL 21429 is furthermore useful for the treatment of ulcers, as indicated by tests on the phenyl butazone ulcer in the rat and on the Shay rat.

The antibiotic SL 21429 is furthermore useful as an immuno-suppressant, as indicated by the target cell destruction test [Immunology 18, 501 (1970)], in which the new antibiotic inhibits target cell lysis by a sensibilization of spleen cells, a 100% inhibition being produced at a dose of 1 mg./liter in vitro.

For each of the above-mentioned uses, the dosage administered will, of course, vary depending upon the mode of administration and treatment desired. However, in general satisfactory results are obtained when administered at a daily dosage of from about 0.1 to 10 mg./kg. animal body weight, conveniently given in divided doses 2 to 3 times a day, or in sustained release form. For the larger mammals, the total daily dosage is in the range of from about 10 to 100 mg., and dosage forms suitable for oral administration comprise from about 3 to 50 mg. of the antibiotic, admixed with a solid or liquid pharmaceutical carrier or diluent.

The antibiotic SL 21429 may be used as a medicament on its own, in pure crystalline or amorphous form or as a suitably refined crude concentrate, or in the form of appropriate medicinal preparations, e.g. tablets, capsules or injectable suspensions, for oral, enteral or parenteral administration. Thus the invention also provides pharmaceutical compositions comprising the antibiotic SL 21429 in pure crystalline or amorphous form or as a suitably refined crude concentrate, in association with a pharmaceutical carrier or diluent.

In the following nonlimitative example all temperatures are indicated in degrees centigrade.

EXAMPLE 10 liters of a nutrient solution, of which each liter contains 50.0 g. of maltose
10.0 g. of bean flour
1.0 g. of peptone
0.5 g. of yeast extract
0.5 g. of $KH_2PO_4$
0.5 g. of $MgSO_4 \cdot 7H_2O$
0.5 g. of $Ca(NO_3)_2$
0.1 g. of NaCl
0.05 g. of $FeSO_4 \cdot 7H_2O$
0.01 g. of $ZnCl_2$
0.01 g. of $MnCl_2 \cdot 4H_2O$
0.005 g. of $CuSO_4 \cdot 5H_2O$
0.005 g. of $CoCl_2 \cdot 6H_2O$ and
Demineralized water to make up one liter, are inoculated in a fermenter with a suspension of spores of the strain NRRL 3877, and incubation is effected at 27° for 10 days at a pH of 5.7 while aerating (1 liter of air/minute/liter of nutrient solution) and stirring (300 revolutions/minute). The culture liquid is thereafter filtered, whereby approximately 9 liters of culture filtrate and approximately 1 kg. of mycelium are obtained. The culture filtrate is extracted thrice with 9 liters of ethylene chloride. The organic phases are subsequently washed twice with 4 liter amounts of water, are dried over sodium sulphate and evaporated to dryness. After defatting with petroleum ether, the crude extract is chromatographed on silica gel Merck (0.05 to 0.2 mm. particle size), and the new antibiotic SL 21429 is eluted with a mixture of chloroform/methanol (98:2) and is purified by recrystallizing from ether, from ethyl acetate, and twice from chloroform.

An additional amount of the pure antibiotic SL 21429 may be obtained from the mycelium. This is treated thrice in an Ultraturrax apparatus with 1 liter of 90% methanol. The resulting crushed mycelium is filtered off, the methanol is distilled off from the filtrate, and the remaining aqueous solution is extracted thrice with 0.5 liter of ethylene chloride. The ethylene chloride solutions are washed with 0.3 liter of water, dried over sodium sulphate and evaporated to dryness. The resulting crude extract is defatted as described above for the culture filtrate, and is subsequently chromatographed, whereby the new antibiotic SL 21429 is obtained.

The suspension of spores, used as starting material, is obtained as follows:

A nutrient medium, of which each liter contains 20 g. of cerelose
2 g. of peptone
2 g. of malt extract
2 g. of yeast extract
2 g. of $KH_2PO_4$
2 g. of $MgSO_4 \cdot 7H_2O$
15 g. of agar-agar and
Demineralized water to make up 1 liter, is inoculated with the strain NRRL 3877 and incubated at 27° for 12 days. The mycelium carpet grown on this nutrient medium is suspended in a physiological common salt solution.

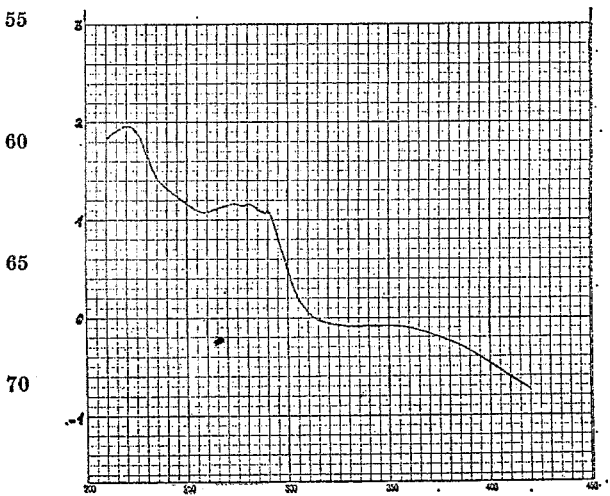

Figure 1

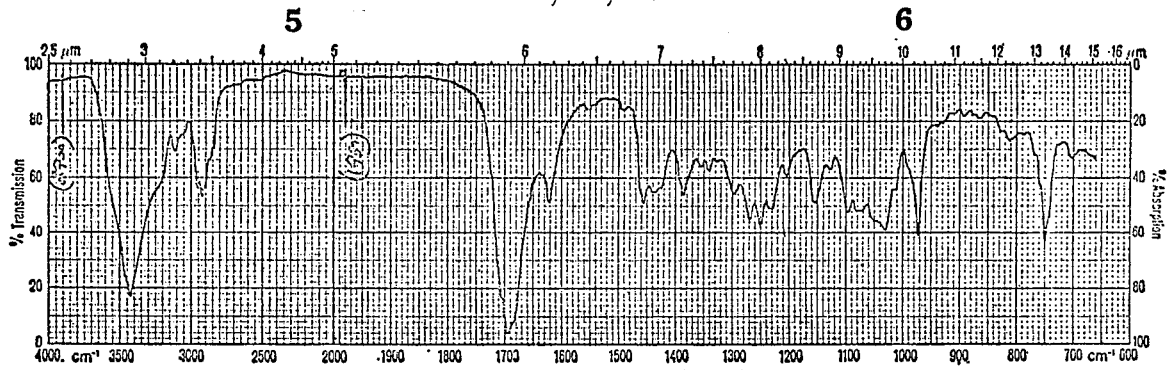

Figure 2

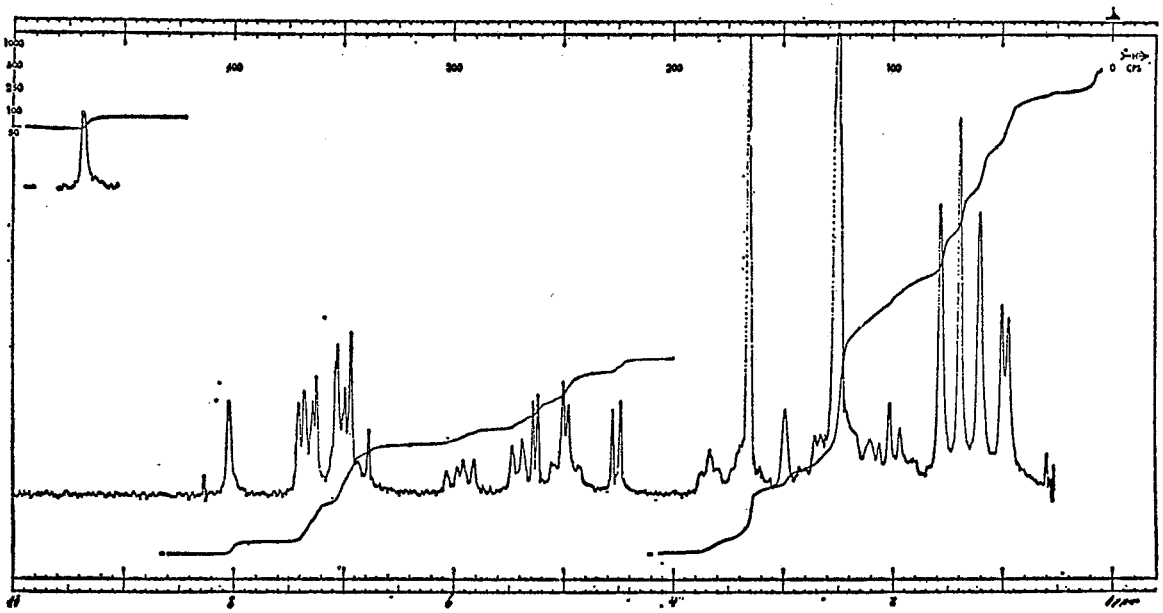

Figure 3

Explanations for Figure 3:

| | |
|---|---|
| Solvent | DMSO |
| Temperature, °C | Ambient |
| Freq. response, cps | 5 |
| R.F. attenuator, db | 25 |
| Sweep time, sec | 250 |
| Sweep width, cps | 1,000 |
| Sweep offset, cps | 0 |
| Spectrum amp | |
| Lock signal | TMS |
| Field milligauss (man. osc. freq.), m.gauss | |
| Field milligauss (sweep freq.), m.gauss | |

Field sweep ☒    Freq. sweep ☐

What is claimed is:

1. A process for the production of the antibiotic SL 21429 having the following characteristics:

Yellow crystals having a M.P. between 172 and 182°, with the formation of new crystals having a M.P. of 238° (decom.), Specific rotation: $[\alpha]_D^{20} = -376°$ (c.=0.78 in pyridine), Elementary analysis: C, 73.1%; H, 6.8%; N, 5.3%; O, 15.1%, Ultraviolet spectrum: maxima at 221 nm. (log $\epsilon'$ =1.96), 274 nm. (log $\epsilon'$=1.16), 280 nm. (log $\epsilon'$ =1.16), 290 nm. (log $\epsilon'$=1.09) (in methanol) (see FIG. 1), Infrared spectrum: Inter alia bands at 3450, 2920, 1965, 1620 cm.$^{-1}$ (in KBr) (see FIG. 2), Nuclear magnetic resonance spectrum: (in dimethyl sulfoxide) (see FIG. 3), which comprises cultivating the strain NRRL 3877 of the fungus species *Chaetomium globosum* Kunze ex Fries under aerobic fermentation conditions in a nutrient medium containing assimilable sources of carbon and nitrogen until a sufficient amount of antibiotic SL 21429 has been produced.

2. The antibiotic SL 21429, having the following characteristics:

Yellow crystals having a M.P. between 172 and 182°, with the formation of new crystals having a M.P. of 238° (decomp.), Specific rotation: $[\alpha]_D^{20} = -376°$ (c.=0.78 in pyridine), Elementary analysis: C, 73.1%; H, 6.8%; N, 5.3%; O, 15.1%, Ultraviolet spectrum: maxima at 221 nm. (log $\epsilon'$ =1.96), 274 nm. (log $\epsilon'$=1.16), 280 nm. (log $\epsilon'$ =1.16), 290 nm. (log $\epsilon'$=1.09) (in methanol) (see FIG. 1), Infrared spectrum: Inter alia bands at 3450, 2920, 1965, 1620 cm.$^{-1}$ (in KBr) (see FIG. 2), Nuclear magnetic resonance spectrum: (in dimethyl sulfoxide) (see FIG. 3).

3. A pharmaceutical composition comprising 3 to 50 mg. of the antibiotic SL 21429 of claim 2, in association with a pharmaceutical carrier or diluent.

References Cited
UNITED STATES PATENTS 3,438,998   4/1969   Sproston, Jr. _____ 424—122

JEROME D. GOLDBERG, Primary Examiner

U.S. Cl. X.R.

195—81